Patented Jan. 1, 1952

2,580,602

UNITED STATES PATENT OFFICE 2,580,602

POLYBUTADIENE PADDING BATH FOR SHRINKPROOFING WOOL

John B. Rust, East Hanover, N. J., and Charles W. Pfeifer, Philadelphia, Pa., assignors, by direct and mesne assignments, of one-half to Montclair Research Corporation, Montclair, N. J., a corporation of New Jersey, and one-half to Ellis-Foster Company, a corporation of New Jersey No Drawing. Application July 28, 1948, Serial No. 41,175

8 Claims. (Cl. 260—29.7)

This invention relates to padding baths for the treatment of wool to produce shrinkproofed wool with substantially normal hand, to such padding baths containing synthetic polybutadiene polymers, to the polymers themselves and to methods of making and utilizing such baths and polymers. This application is a continuation-in-part of application Serial No. 603,406 filed July 5, 1945, entitled Aqueous Dispersions of Butadiene Polymers and Treatment of Wool Therein, now Patent No. 2,447,772.

It is known that it is possible to produce non-felting and non-shrinking wool by chlorination and bromination of the wool. There have also been described processes of producing non-felting wools by treatment with alcohol solution of alkalies, by treatment with sulfuryl chloride, nitrosyl chloride, and the like.

Treatment of wool with rubber latex in the presence of quaternary ammonium, phosphonium, and sulfonium compounds and the application of alkylated methylol melamine at relatively high temperatures have also been described. Furthermore, a large number of literature references and references in the patent art may be found wherein the preparation of butadiene polymer emulsions and butadiene copolymer emulsions are described. In the prior art processes of treating wool, difficulties are encountered including danger of damage to fibers, reduced wearing qualities, and undesirable hand, which are difficult to prevent in most of these previously described processes.

It is known that it is possible to produce butadiene polymers and copolymers which are suitable for manufacture of synthetic rubber or elastomers or used as latex to replace natural rubber latex. However, these polymers are entirely unsuited for application to textile fibers since in order to produce good rubbery materials, it is necessary to retain a certain amount of tack and millability. However, when these last described polymers are applied to textiles, highly undesirable, sticky or unpleasant feel is imparted to the textile whether it be wool, cotton, or rayon and the like. For certain purposes, such as water-proofed cloth rain coats, where continuous coated surfaces are produced, these properties are highly desirable, but such continuously coated materials, or emulsions used to produce such continuous coated materials are not suitable for the shrinkproofing of wool, or for the treatment of other fibers and textiles in accordance with the present invention. The ordinary butadiene polymer emulsions are very sticky emulsions unsuitable for the purposes in hand.

Further with many of these prior art polymers, when the wool is treated with them, the resulting product is rather harsh and does not have the hand desired in such wool products. In addition, many of such polymers give a very disagreeable odor to the treated wool material which it is not possible to remove by washing.

Among the objects of the present invention is the production of baths for the treatment of wool by padding procedures which give shrinkproofed wool of substantially normal hand.

Other objects include the production of polymers for use in such baths and methods of producing such polymers and baths and their utilization.

Still further objects will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, aqueous emulsions of a synthetic butadiene polymer are prepared for the treatment of fibers and textiles in which the polymer is in a pre-vulcanized condition so that upon deposition of the polymer on, in or about the fibers or textiles, the polymer is in a non-tacky condition and gives a non-tacky deposit. Or the polymer in such emulsions utilized in accordance with the present invention is in a condition in which it is substantially insoluble in organic solvents such as benzene, toluene, xylene, carbon tetrachloride, chloroform, and tetrachlorethane, but, however, may be swollen to some extent with such solvents. As formed, the emulsions contain the butadiene polymers and copolymers in a condition in which they are totally unsuitable as synthetic rubber or rubber-like materials. If coagulated by any suitable means, the emulsions give crumbly materials which cannot be milled on rubber milling equipment and which are entirely composed of cross-linked polymers. The vulcanization has been carried to a point where substantially no soluble polymer remains, but, as stated above, the gel-forming polymer may be swollen to some extent with the stated solvents.

Emulsions of the character employed in accordance with the present invention may be produced from any of the ordinary aqueous emulsions of butadiene polymers and copolymers by subjecting such emulsions to oxidation to convert them into the condition referred to immediately above.

Thus a two stage method is employed for producing the emulsions in which first, the emulsions are prepared by carrying out the polymerization of butadiene or butadiene copolymers in the presence of polymerizing agents in which emulsions the polymer or copolymer is present in such condition that if deposited on fibers a tacky deposit would be obtained, or the polymer is substantially soluble in common organic solvents at this time, or is incompletely vulcanized, and second, the emulsion prepared in the first step is subjected to an oxidative treatment by means of hydrogen peroxide or other substances which liberate oxygen under the conditions of treatment to convert the polymer or copolymer present in such emulsions into a condition where upon deposition on fibers it gives a non-tacky deposit, or gives a deposit which is substantially insoluble in common organic solvents, or is substantially completely vulcanized and in the form of a cross-linked polymer. The first step is carried to a point of substantially complete polymerization, by which is meant little or no monomer is present. The emulsion at this point may be subjected to vacuum or other treatment to remove any volatile hydrocarbons which may be present, before the step of oxidative vulcanization. The term oxidative pre-vulcanization may be used to describe the final condition of the polymer in the emulsion without any implication that an oxygen link is necessarily involved.

The polymers in the emulsions employed in accordance with the present invention possess the property of being entirely non-tacky when applied to textile materials or fibers. For example, for the treatment of wool, a shrinkproofing is obtained while the wool otherwise remains unchanged in appearance, possesses good hand and feel, etc. The invention is particularly exemplified in connection with the treatment of wool to produce shrinkproofing, but may be utilized in connection with other fibers and textiles to give such textiles markedly improved characteristics with respect to drape, hand, crease control and the like. The treatment of wool will, therefore, be utilized to exemplify the present invention.

In accordance with the present invention, the wool fiber or textile is subjected to the bath by a padding procedure. Thus the solutions or emulsions may be applied to the wool on a padder wherein the fabric is first conveyed through a pad box containing the pad liquor and then passes between squeeze rollers, thus removing excess liquid. The fabric is then dried at a suitable temperature, for instance, of 110 to 120° C., but no curing is required. The amount of solids deposited on the fabric may be regulated depending on the desired amount of shrinkproofing to be imparted and is affected by the construction of the fabric, the setting of the squeeze rollers, the concentration and temperature of the pad liquor. From 1 to 25% by weight of polymer deposition on the wool may be obtained readily by these methods producing wool of highly improved characteristics, shrinkproofed while retaining substantially normal hand.

For application on textile materials, and particularly in connection with wool, it is also highly desirable to have incorporated in the final emulsion after oxidative vulcanization has taken place, an antioxidant, such as an aliphatic and aromatic amine, polyphenol, sulphide, and derivatives of these types of antioxidants, and the like. When the specially prepared emulsions of the present invention are deposited on textile materials, a very great surface of the polymer is exposed and this is subject to oxidative effects causing the polymer in time to become embrittled. While the present invention is concerned with an oxidative pre-vulcanization of the emulsion, it is desirable that this vulcanization not continue after the material has been applied to the textile. Consequently antioxidants are highly important for those utilizations where further change in the deposited material is not to take place.

Thus it has been found that oxidative pre-vulcanization must be resorted to, to produce a material acceptable to the textile trade and consumers. Further, after the oxidative pre-vulcanization has occurred in the emulsion, this emulsion must be protected against further degrading oxidative polymerization which occurs when the large surfaces of the polymer which had been deposited on the textile, is exposed to the air. Thus an essential part of the emulsion of the present invention consists of suitable antioxidants which are added after the oxidative pre-vulcanization of the emulsion has been accomplished, when the emulsions are to be employed for purposes where continuous oxidative degradation is to be avoided.

The utilization of butadiene polymers is emphasized in accordance with the present invention, because for certain purposes, as for example, in the shrinkproofing of wool, the result obtained depends on the presence of such butadiene polymers or butadiene homologue polymers. Straight butadiene polymers or butadiene homologue polymers give notably superior non-felting effects than do butadiene copolymers, in the shrinkproofing of wool, and for such purposes, therefore, the polymeric derivatives from butadiene alone or butadiene homologues alone are preferred to copolymers. The term "straight" may be used to indicate polymers produced from a butadiene or its homologue without interpolymerization with other unsaturated non-butadiene type compounds. The polymeric butadiene derivatives may be for example, the polymers of butadiene and its higher homologues and related compounds such as isoprene, dimethyl, butadiene, ethyl butadiene, ethoxy and methoxy butadiene, cyanobutadiene, and the like, particularly butadiene-1.3 and its derivatives, since as stated, these produce a much superior non-felting effect on wool, than do copolymers containing substantial amounts of other vinyl or methyl substituted vinyl compounds. The butadiene polymer itself is thus necessary for the production of good shrinkproofing qualities in wool treated with these emulsions. Butadiene copolymers may be used even in connection with shrinkproofing effects, but in that event, the proportion of the copolymerizing constituent should be within the limits necessary to obtain the results sought. Considering the use of these emulsions for shrinkproofing of wool, it may be pointed out for example, that in a series of copolymers of butadiene with methyl methacrylate, as the methyl methacrylate content of the copolymer increased, the non-felting characteristics imparted to the wool fibers decreased so that a butadiene polymer containing no methyl methacrylate renders wool entirely non-felting whereas a straight methyl methacrylate has no effect upon the felting qualities under the same operating conditions. The same results have been found to be true with every vinyl compound tested. For such shrinkproofing effects it has been found that a methyl methacrylate ester should not be present to an amount exceeding 20% of the interpolymer, an ethyl methacrylate ester to an amount not exceeding 50% of the interpolymer, and a butyl methacrylate to an extent not exceeding 40% of the interpolymer if substantial shrinkproofing effect is to be obtained. Similarly, styrene when used should be not more than 60% by weight of the copolymer, while $\alpha,\beta$ dimethylstyrene or dichlorostyrene should not exceed 40% by weight of the copolymer. Within those limits where shrinkproofing is sought, or in other cases where the treatment of other fibers and textiles is involved and shrinkproofing is not the end sought, vinyl compounds and methyl substituted vinyl compounds may be copolymerized with the butadiene or butadiene derivatives to give compositions having satisfactory properties, the amount of vinyl compound present in the copolymer being regulated as indicated. As illustrative of such vinyl or related components there may be used vinyl acetate, methyl methacrylate, ethyl acrylate, styrene, acrylonitrile, vinyl pyridine, methacrylonitrile, isopropenyl methyl ketone, vinyl phenyl ketone, vinyl methyl ketone, and the like.

In the utilization of the padding liquors, the desired liquor may be readily prepared by mere dilution of the synthetic polymer emulsion with water, to the concentration desired. For example, the emulsion may be simply diluted with water to a 5% concentration. For example, if an emulsion is used which contains 30% solids and this emulsion is diluted with 4 parts of water for every part of emulsion, and the fabric is squeezed to such an extent that it increases 80% in weight (80% wet pick-up), a total of 4.8% solid is deposited on the fabric. In practice a range of from 1 to 25% of solids is deposited on the fabric in such operations.

The temperature at which the padding operation is carried out is not critical and it may vary for example, from room temperature or about 20° C. to 65° C., the higher temperatures being useful in obtaining more thorough penetration. However, when the temperature is too high excessive build-up on the rollers may occur and should generally be avoided. After the padding operation has been carried out, the treated wool should be removed from the bath as set forth above, and should be dried first before any further wet processing is carried out.

Accordingly, following the present invention, padding baths are produced which contain as the only essential components a substantially stable aqueous emulsion of a synthetic butadiene polymer in amount to give 1 to 25% by weight of polymer deposition on the wool, the polymer being in completely cross-linked condition, the treated polymer in coagulated condition being crumbly and not millable on a rubber milling machine. Desirably, such padding baths also contain suitable commercial wetting or penetrating agents such as for instance, the sodium salts of the sulfates of the higher or long chain alcohols such as sodium lauryl sulfate; aromatic sulfonates, particularly the alkyl aromatic sulfonates, such as sodium amyl naphthylene sulfonate and the like, desirably present in amounts to assist the wetting out of the fabric. The amounts of such wetting or penetrating agents will generally run from about 0.35 to 5% on the total weight of the baths and more usually will be from ½ to 2%. If anionic emulsifying agents have been utilized in the preparation of the substantially stable aqueous emulsion of the synthetic butadiene polymer, and are present in the necessary amounts of the order indicated above, then it will not be necessary to add additional wetting or penetrating agents to the bath. Where such wetting or penetrating agents are not present in the substantially stable emulsions of the polymer, they may be added thereto as indicated above. Frequently the padding baths are desired to be used at a pH below 7, and the pH of the bath may be adjusted to such values if desired since in many instances an improved padding effect is obtained where the pH of the padding bath is below 7.

As examples to illustrate polymers that may be utilized in carrying out the present invention, the following are given, the parts being by weight unless otherwise indicated.

*Example 1.*—A butadiene polymer emulsion was prepared as follows. 105 parts of a buffer solution of pH=11, 0.56 part of ammonium persulfate and 5 parts of soap ("Ivory Flakes") were placed in a pressure reactor cooled to below —5° C. The buffer solution consisted of 35.8 parts of disodium phosphate and 7.16 parts of tri-sodium phosphate dissolved in 980 parts of distilled water. 50 parts of butadiene, which has been passed over calcium chloride and condensed in a second pressure reactor cooled to below —5° C. were now added to the chemicals in the first reactor. The reactor was then sealed and allowed to come to room temperature. It was then placed into an agitator with a constant temperature water bath at 45° C. and shaken for 40 hours. The reactor was taken out, allowed to cool, and opened. Only a very slight pressure was observed and no foaming took place when the reactor was opened and thus complete polymerization with a solid content of 33⅓% was indicated. The emulsion was then treated with 5% of 30% hydrogen peroxide at 90–100° C. for one hour. Foaming took place initially which finally subsided. An emulsion was formed whose polymer was completely insoluble in organic solvents, indicating a very high degree of oxidative prevulcanization.

Such emulsion applied to the treatment of wool as set forth above, produces good shrinkproofing, a good hand, and the original wool-like appearance of the textile.

*Example 2.*—A butadiene-styrene copolymer emulsion was prepared as follows. 45 parts of butadiene, which had been passed over calcium chloride, were condensed in a pressure reactor cooled to below —5° C., 5 parts of styrene, which had been distilled previously, 100 parts of distilled water, 5 parts of a 10% aqueous solution of ammonium persulfate and 5 parts of soap ("Ivory Flakes") were then added to the butadiene in the pressure reactor. The reactor was sealed, allowed to come to room temperature and placed in a shaker with a constant temperature water bath at 45° C. The rector was shaken for 40 hours. After that period, the polymerization was quite complete since only a trace of pressure was observed on opening the reactor at room temperature. The solid contents of this emulsion was, therefore, 33⅓%. The emulsion was treated with 5% of a 30% hydrogen peroxide solution for one hour at 90–100° C. Considerable foaming was encountered and some slight separation of polymer was observed during the reaction which removed by subsequent filtration. The polymer contained in the emulsion was entirely insoluble in organic solvents indicating a complete oxidative pre-vulcanization.

Such emulsion may be utilized as set forth above in the treatment of a wool textile and results in excellent shrinkproofing of the wool, good hand and a wool-like appearance.

*Example 3.*—A butadiene-a, p-dimethyl styrene copolymer emulsion was prepared as follows: 20.0 parts of butadiene, which had previously been passed over calcium chloride and had been condensed, and 5.0 parts of a, p-dimethyl styrene, which had been distilled previously, were placed in a pressure reactor cooled to below —5° C. 50 parts of distilled water, 2.5 parts of a 10% aqueous solution of ammonium persulfate, and 5 parts of soap ("Ivory Flakes") were added. The reactor was sealed and allowed to come to room temperature. The vessel was then placed in a shaker with a constant temperature water bath at 45° C. and left there for 40 hours. At the end of this period the polymerization was quite complete since only a trace of pressure was observed when the reactor was opened at room temperature. The solid content of the emulsion was, therefore, 33⅓%. The emulsion was treated with 5% of a 30% hydrogen peroxide solution for one hour at 90–100° C. The poylmer contained in the emulsion was entirely insoluble in organic solvents indicating substantial oxidation vulcanization.

Such emulsion may be utilized in the treatment of wool or other textiles and fibers and when utilized for shrinkproofing of wool, gives good shrinkproofing, with good hand and with wool-like appearance.

*Example 4.*—A butadiene polymer emulsion was made by mixing 50 parts of monomeric butadiene, 100 parts of buffer solution composed of disodium and trisodium phosphate at a pH of 11, 5 parts of 30% hydrogen peroxide and 5 parts of sodium lauryl sulfate. The mixture was placed in a pressure reactor and heated for 40 hours at 45° C. In this time complete polymerization had occurred as evidenced by the fact that the internal pressure of the reactor dropped to zero.

192 parts of the above described emulsion, not containing however, any stabilizer, were treated with 9.6 parts of 30% hydrogen peroxide for three-quarters of an hour at 70° C. After this oxidative pre-vulcanization had been carried out, 2% of the monobenzyl ether of hydroquinone based on the polymer content of the emulsion, were added. This vulcanized emulsion may be used in accordance with the present invention for treatment of wool to produce a wool product of desired hand and which has been shrinkproofed.

It has been found in general, that the shrinkproofing characteristics of butadiene emulsions or butadiene copolymer emulsions are somewhat improved by the oxidative pre-vulcanization process of the present invention. So that in accordance with this invention, it is possible to enhance the shrinkproofing characteristics of butadiene polymer emulsions and copolymer emulsions by the process of oxidative vulcanization, as described herein.

*Example 5.*—50 parts of butadiene monomer, 100 parts of buffer solution composed of disodium and trisodium phosphate at a pH of 11, 6 parts of a 10% solution of ammonium persulfate, and 5 parts of sodium lauryl sulfate were placed in a pressure reactor and heated at 45° C. for 40 hours. Complete polymerization had occurred in this time. 320 parts of this emulsion were treated with 30 parts of 30% hydrogen peroxide solution at 70° C. for 45 minutes. Such baths may be used in accordance with the present invention either with or without the incorporation of antioxidants such as monobenzyl ether of hydroquinone. Where the antioxidants are employed they may be present in any desired amount but usually will run from about 1 to 5% by weight on the polymer.

*Example 6.*—A butadiene polymer emulsion was prepared in the following manner.

The butadiene was passed over calcium chloride and condensed in a pressure reactor cooled to below —5° C. 75 parts of butadiene were then weighed out in the reactor. While the reactor was still kept in the freezing mixture 150 parts of a buffer solution of pH 11, 7.5 parts of 30% hydrogen peroxide and 7.5 parts of sodium lauryl sulfate were added. The buffer solution of pH 11 had been prepared by dissolving 35.8 parts of disodium phosphate and 7.16 parts of trisodium phosphate in 980 parts of distilled water. The reactor was then closed, allowed to come to room temperature and put in an agitator with a constant temperature bath at 45° C.

After 48 hours the reactor was taken out, cooled and opened. There were no signs of pressure when the reactor was opened. Thus complete polymerization, and therefore, a polymer content of 33⅓% was secured. (Emulsion A.)

Portions of this emulsion were now oxidized by means of various oxidizing agents.

B.

40 parts of Emulsion A
4.28 parts of benzoyl peroxide
4.28 parts of 50% active mixture of sodium alkyl sulfates The peroxide and the sodium alkyl sulfate paste were ground together in a mortar, then added to the Emulsion A. The flask was connected to a reflux condenser and the reaction mixture was kept at 80–90° C. for 1½ hours. A slight amount of polymer separated out during the oxidation and it was removed by filtration.

C.

40 parts Emulsion A
4.03 parts ammonium persulfate
4.03 parts water

The ammonium persulfate was dissolved in the water and the solution was added to Emulsion A. The mixture was then kept at 80–90° C. for 1½ hours and subsequently filtered as described under B.

D.

40 parts of Emulsion A
7.06 parts acetyl peroxide (4% available oxygen)
2.10 parts mixture of sodium alkyl sulfates
2.00 parts water The peroxide, the sodium alkyl sulfates and the water were mixed together thoroughly then added to Emulsion A. The procedure for the heating and filtration was the same as described under B.

E.

40 parts Emulsion A
2.82 parts tert. butyl hydroperoxide (10% available oxygen)
1.64 parts mixture of sodium alkyl sulfates The peroxide and the sodium alkyl sulfates were thoroughly mixed and then added to Emulsion A. The mixture was then treated as described under B.

F.

40 parts Emulsion A
3.42 parts tert. butyl perbenzoate
3.42 parts mixture of sodium alkyl sulfates The perbenzoate and the sodium alkyl sulfates were thoroughly mixed and added to Emulsion A. The heating and filtration were carried out as described under B.

The amounts of oxidizing agents were chosen so as to contain the same amount of available oxygen. Wherever the mixture of sodium alkyl sulfates was added in the oxidations an amount of the 50% active paste equal to the active material in the oxidizing agent was used to secure good emulsification.

Samples B to F utilized in accordance with the procedures set forth herein may be utilized to produce satisfactory products.

Example 7.—An emulsion containing a copolymer of a, p-dimethyl styrene and butadiene was prepared. The butadiene was passed over calcium chloride and condensed in a pressure reactor cooled to below −5° C., 22.5 parts of butadiene were weighed out in the reactor. 2.5 parts of a, p-dimethyl styrene, which had previously been distilled, were added, followed by 50 parts of a buffer solution of pH 11, 3 parts of a 10% ammonium persulfate solution and 2.5 parts of sodium lauryl sulfate. The buffer solution of pH 11 had been made up by dissolving 35.3 parts of disodium phosphate and 7.16 parts of trisodium phosphate in 980 parts of distilled water. The reactor was then sealed, allowed to come to room temperature and put in an agitator with a constant temperature bath at 45° C.

After 24 hours the reactor was taken out, cooled and opened. Only slight pressure was noticed on opening. Thus complete polymerization with a polymer content of 33⅓% was obtained.

40 parts of this emulsion were oxidized with a mixture of 4.28 parts of benzoyl peroxide and 4.28 parts of a 50% active mixture of sodium alkyl sulfates. The peroxide and the sodium alkyl sulfates were ground together in a mortar, before the mixture was added to the emulsion. The reaction mixture was then kept at 80–90° C. for 1½ hours under a reflux condenser. A slight amount of polymer separated out during the oxidation and was removed by filtration. The polymer content of this treated emulsion was 27.4% after treatment.

Example 8.—A butadiene polymer emulsion was prepared as follows: 6 parts of soap ("Ivory Flakes") was dissolved in 125 parts of water and the pH of the water-soap solution was adjusted to 10 by the addition of a small amount of 5% sodium hydroxide solution. The following catalyst and regulators were then added to the soap solution, 0.1 part of dodecyl mercaptan, 0.01 part of potassium ferricyanide, 0.2 part of potassium persulfate. 50 parts of pure butadiene were then added to the other ingredients and the resulting emulsion agitated for 16 hours. The polymerization reaction was carried out in a steel jacketed kettle. The polymerization reaction, which is exothermic, was controlled by controlling the temperature of the water flowing through the jacket. Throughout the first 8 hours of the reaction, the jacket temperature was controlled to 128° F., then the temperature increased to 148° F. for the next 8 hours. In the early stages of the reaction, while the jacket was being controlled at 128° F., the internal temperature of the batch reached a peak of 140° F. After 16 hours the reaction was substantially complete as indicated by a very slight pressure within the reactor. The emulsion was then subjected to a vacuum of approximately 15 pounds per square inch to draw off the very small amount of monomer gases that may be present. The polymer emulsion was then given an oxidation treatment as follows: added 1% of the sodium salt of sulfonated oleyl alcohol and 2½% of a 30% hydrogen peroxide solution, then heated for 1 hour, the temperature rising gradually to 200° F. The emulsion was used to treat woolen fabrics in accordance with the present invention.

As exemplary of the padding procedure carried out with emulsions of the character set forth above, the following is exemplary.

Example 9.—A padding solution containing 5% solids was prepared from the polybutadiene dispersion produced in accordance with Example 5, the particular dispersion in this instance containing 25% solids which was diluted with water to give the 5% solids containing bath. Squares of wool flannel were immersed in the treating bath until completely wet, the excess liquor removed by passing the fabric through squeeze rollers, and the samples then dried at 60° C. 105% liquid was picked up by the wool and 5.25% solids deposited on the wool. After drying the wool swatches they were washed for 3 hours in a mechanical washing machine containing water at 70° C. and sufficient neutral soap to produce a running suds. After washing, the wool squares were rinsed, dried and measured. Percent shrinkage after the three hour washing was: warp 7.9, fill 5.1. There was no felting. Compared with an untreated wool control sample, the percentage shrinkage after three hours washing was: warp 44.1, fill 20.3 and the felting was very bad.

Example 10.—The padding solution in this case was the same as in the preceding example, but was diluted with water to contain 2% of solids. Samples of wool flannel were treated with these solutions, dried, washed and measured according to the procedure of the preceding example. An untreated control was included in the washing. The treated wool flannel showed a pick-up of 113.3% liquid of the polybutadiene emulsion containing 2% solids while the percent polymer deposited on the wool was 2.27.

The shrinkage and felting observed after 3 hours laundering was as follows: The wool sample treated with the polybutadiene emulsion showed a warp shrinkage of 6.7 as compared with 32.4 for the untreated control; a fill shrinkage of 2.8 as compared with 16.1 for the untreated control; there was no felting of the treated wool, whereas the untreated control showed very bad felting.

Having thus set forth our invention, we claim:

1. A padding bath for treating wool to give shrink-proofing while retaining substantially normal hand, said bath consisting of as the only essential components a substantially stable aqueous emulsion of a synthetic butadiene polymer in amount to give 1 to 25% by weight of polymer deposition on the wool, the polymer being in completely cross-linked condition, the treated polymer in coagulated condition being crumbly and not millable on a rubber milling machine, said bath containing an anionic wetting agent in an amount of from 0.35 to 5% on the total weight of the bath.

2. A padding bath as set forth in claim 1 in which the polymer is a synthetic homobutadiene polymer.

3. A padding bath as set forth in claim 2 in which the bath has a pH below 7.

4. A padding bath as set forth in claim 1 in which the polymer is a copolymer of butadiene and styrene, the amount of styrene not exceeding 60% by weight of the copolymer.

5. A padding bath as set forth in claim 4 having a pH below 7.

6. A padding bath as set forth in claim 1 in which the polymer is a copolymer of butadiene and dimethyl styrene, the latter not exceeding 40% by weight of the copolymer.

7. A padding bath as set forth in claim 6 having a pH below 7.

8. A padding bath as set forth in claim 1 in which the emulsion contains 5% by weight of the polymer and the padding bath has a pH below 7.

JOHN B. RUST.
CHARLES W. PFEIFER.

REFERENCES CITED

The following references are of record in the file of this patent:

UNITED STATES PATENTS

| Number | Name | Date |
| --- | --- | --- |
| 2,344,843 | Wellman | Mar. 21, 1944 |
| 2,447,772 | Rust et al. | Aug. 24, 1948 |